US011447988B2

(12) United States Patent
Kotha

(10) Patent No.: US 11,447,988 B2
(45) Date of Patent: Sep. 20, 2022

(54) TURN OFF THE CAR WHEN PUMPING THE GAS IN THE GAS STATIONS

(71) Applicant: Panasonic Automotive Systems Company of America, Division of Panasonic Corporation of North America, Peachtree City, GA (US)

(72) Inventor: Mahender Reddy Kotha, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 445 days.

(21) Appl. No.: 16/670,231

(22) Filed: Oct. 31, 2019

(65) Prior Publication Data

US 2020/0141160 A1 May 7, 2020

Related U.S. Application Data

(60) Provisional application No. 62/756,854, filed on Nov. 7, 2018.

(51) Int. Cl.
| | |
|---|---|
| *E05B 81/74* | (2014.01) |
| *B60W 10/06* | (2006.01) |
| *B60K 15/04* | (2006.01) |
| *B60K 15/03* | (2006.01) |

(52) U.S. Cl.
CPC .......... *E05B 81/74* (2013.01); *B60K 15/0406* (2013.01); *B60W 10/06* (2013.01); *B60K 2015/0321* (2013.01); *B60K 2015/0493* (2013.01)

(58) Field of Classification Search
CPC ............... E05B 81/74; B60K 15/0406; B60K 2015/0321; B60K 2015/0493; B60W 10/06
USPC .......................................................... 70/237
See application file for complete search history.

(56) References Cited

U.S. PATENT DOCUMENTS

| | | | | |
|---|---|---|---|---|
| 7,322,338 B1 * | 1/2008 | Brister | ............... | B60K 15/0406 123/198 D |
| 7,841,315 B1 * | 11/2010 | Brister | ................. | B60K 15/073 123/198 D |

FOREIGN PATENT DOCUMENTS

| | | | | | |
|---|---|---|---|---|---|
| DE | 102012222722 | A1 * | 4/2014 | ............. | B60L 50/72 |
| JP | 09254670 | A * | 9/1997 | | |
| JP | 2006188993 | A * | 7/2006 | | |
| WO | WO-2010113902 | A1 * | 10/2010 | .......... | B60L 11/1809 |

* cited by examiner

*Primary Examiner* — Mahmoud Gimie
(74) *Attorney, Agent, or Firm* — Laurence S. Roach, Esq.

(57) ABSTRACT

A motor vehicle includes an engine and a fuel tank having a cap with a first position in which the cap seals the fuel tank and a second position in which the cap does not seal the fuel tank. A sensor detects whether the cap is in the first position or the second position. An electronic processor is communicatively coupled to the engine and to the sensor. The electronic processor turn offs the engine in response to the sensor detecting that the cap is in the second position.

17 Claims, 3 Drawing Sheets

TURN OFF THE CAR WHEN PUMPING THE GAS IN THE GAS STATIONS

CROSS-REFERENCED TO RELATED APPLICATIONS

This application claims benefit of U.S. Provisional Application No. 62/756,854 filed on Nov. 7, 2018, the disclosure of which is hereby incorporated by reference in its entirety for all purposes.

FIELD OF THE INVENTION

The disclosure relates to an engine ignition control system for a motor vehicle.

BACKGROUND OF THE INVENTION

Currently, due to the increased number of fire accidents, safety has become a more significant concern in the auto industry. Original equipment manufacturers (OEM's) are introducing new safety features, and are making those features standard across all vehicle lines. Some of these features are collision warning, adaptive cruise control, adaptive braking, and autonomous driving. Even after incorporating all these features, we see fire accidents due to the driver being distracted by the infotainment system or using a telephone at the gas station. For example, when a person is filling his tank and pumping gasoline into his car, he may absentmindedly leave the engine on (ignition ON). His eyes may be on his phone, and he may be anxious and concentrating on other issues instead of turning off the ignition. Leaving on the engine ignition while pumping gas is a major cause of the increased number of fire accidents at the gas stations and the resulting increase in severe property damage.

SUMMARY

In one embodiment, the present invention may enable people to fill their gas tank safely by incorporating a monitoring system in the steering wheel which helps prevent unwanted fire accidents. The monitoring system in the steering wheel may include a sensor that detects the ignition status of the car from the steering wheel. The monitoring system in the steering wheel may also be in communication with a sensor that detects whether the gas tank cap has been unscrewed and removed from the tank or is otherwise open. When the steering wheel discovers that the fuel tank cap is open, the engine ignition of the vehicle may be turned off, thereby avoiding the engine ignition lighting the gas fumes on fire.

In one embodiment, the invention comprises a motor vehicle including an engine and a fuel tank having a cap with a first position in which the cap seals the fuel tank and a second position in which the cap does not seal the fuel tank, A sensor detects whether the cap is in the first position or the second position. An electronic processor is communicatively coupled to the engine and to the sensor. The electronic processor turns off the engine in response to the sensor detecting that the cap is in the second position.

In another embodiment, the invention comprises a method of operating an engine of a motor vehicle, including providing a fuel tank having a cap with a first position in which the cap seals the fuel tank and a second position in which the cap does not seal the fuel tank. It is detected whether the cap is in the first position or the second position. The engine is turned off in response to detecting that the cap is in the second position.

In yet another embodiment, the invention comprises an engine ignition control system for a motor vehicle. The system includes an engine ignition and an engine ignition sensor to detect whether the engine ignition is ON or OFF. A gas tank cap sensor detects whether a gas tank cap is open or closed. An electronic processor is communicatively coupled to the engine ignition sensor and to the gas tank cap sensor. The electronic processor turns off the engine ignition when both the engine ignition sensor detects that the engine ignition is ON and the gas tank cap sensor detects that the gas tank cap is open.

An advantage of the present invention is that the engine ignition cannot be inadvertently left on while the driver is pumping gas.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
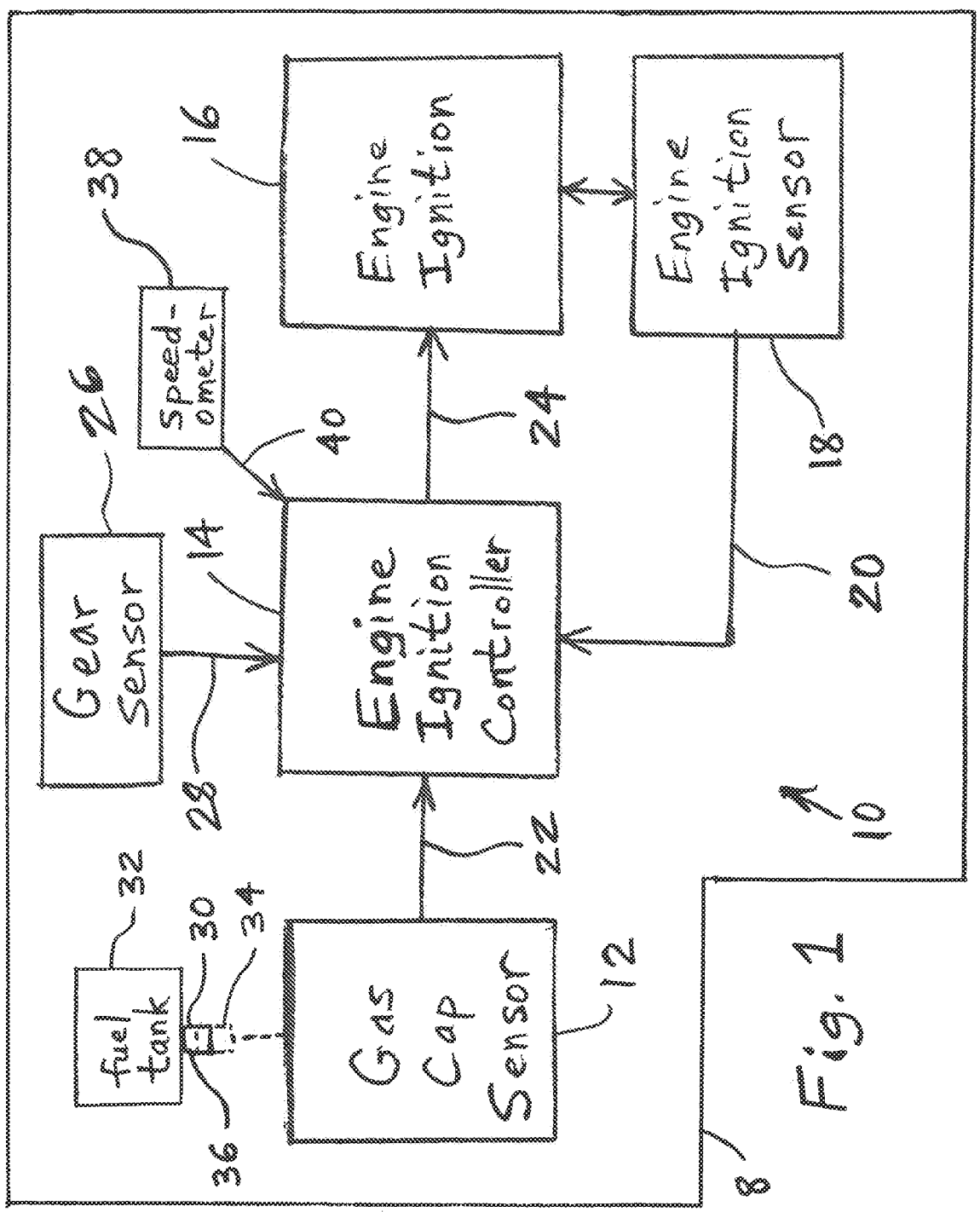
FIG. 1 is a block diagram of one example embodiment of an engine ignition control system of the present invention for a motor vehicle.

FIG. 1 illustrates one example embodiment of an engine ignition control system 10 of the present invention for a motor vehicle 8. Engine ignition control system 10 includes a gas cap sensor 12, and electronic engine ignition controller 14, an engine ignition 16, and an engine ignition sensor 18. Each of these components of system 10 may be carried by a same motor vehicle 8.

During use, engine ignition sensor 18 detects whether engine ignition 16 is turned on. Engine ignition 16 may be on as a result of the driver turning a key or pressing a pushbutton, as is conventionally known. Engine ignition sensor 18 transmits a signal 20 to engine ignition controller 14 indicating whether engine ignition 16 is ON or not.

Gas cap sensor 12 may detect whether a gas cap 30 on a fuel tank 32 of the motor vehicle is open (in the position 34 depicted in dashed lines in FIG. 1) or closed (in the position 36 depicted in solid lines in FIG. 1). When the gas cap is closed, the gas cap may be screwed onto the gas tank, or may otherwise be sealing the gas tank. When the gas cap is open, the gas cap may be unscrewed from the gas tank, or may otherwise be leaving the gas tank unsealed. Engine ignition controller 14 may receive a signal 22 from gas cap sensor 12 indicating Whether the gas cap is open or closed. In the event that signal 20 indicates to controller 14 that engine ignition 16 is ON, AND signal 22 indicates to controller 14 that the gas cap is open, then controller 14 may transmit a signal 24 to engine ignition 16 to turn OFF engine ignition 16. Engine ignition 16 may remain OFF until the driver manually turns engine ignition 16 back ON by turning a key or pressing the ignition pushbutton, for example.

In one embodiment, system 10 includes an optional gear sensor 26 which detects whether the motor vehicle is in the park gear, reverse gear, neutral gear, or a drive gear. Sensor 26 may transmit a signal 28 to controller 14 indicating what gear the motor vehicle is in. In order to avoid turning off engine ignition 16 if gas cap sensor 12 malfunctions while the motor vehicle is traveling on a road, controller 14 may turn OFF engine ignition 16 only if gear sensor 26 indicates that the vehicle is in the park gear or possibly the neutral gear.

In another embodiment, system 10 includes an optional speedometer 38 which detects a speed of vehicle 8. Speedometer 38 may transmit a signal 40 to controller 14 indicating the speed of motor vehicle 8. In order to avoid turning off engine ignition 16 while motor vehicle 8 is traveling on a road, controller 14 may turn OFF engine ignition 16 only if speedometer 38 indicates that vehicle 8 is not in motion.

Figure 2:
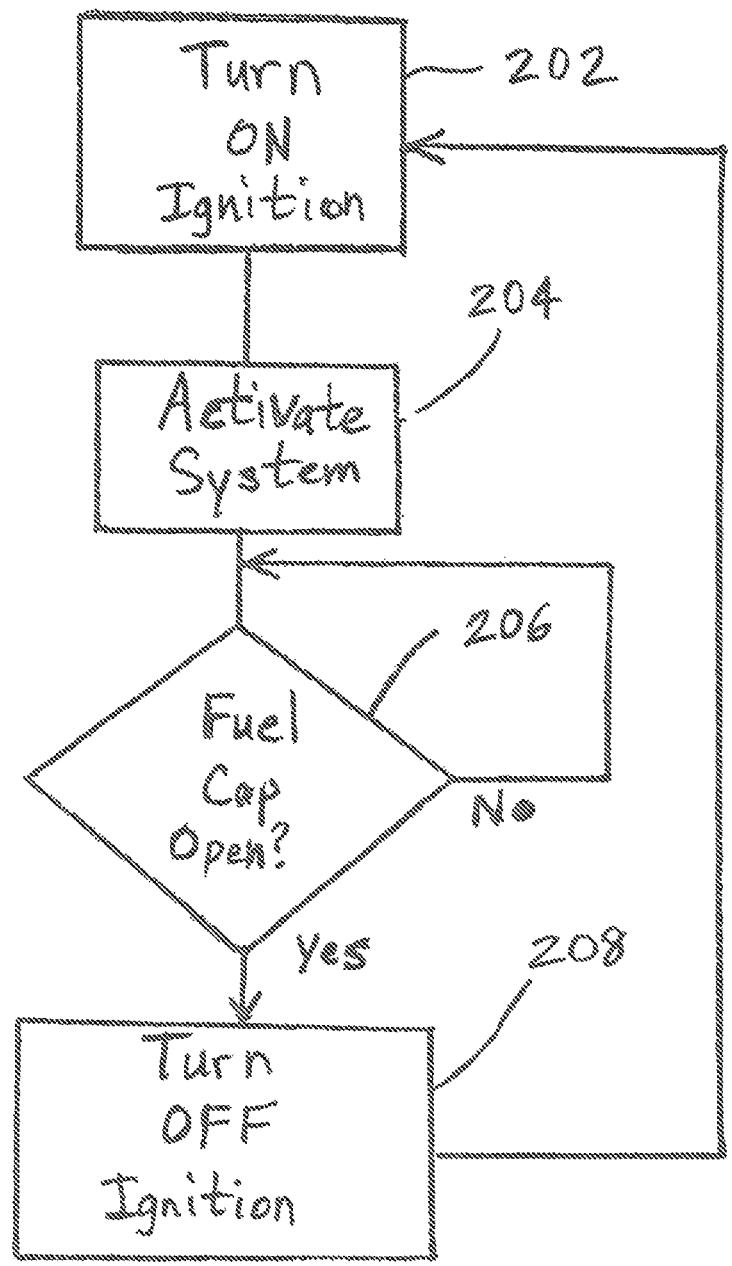
FIG. 2 is a flow chart of one example embodiment of an engine ignition control method of the present invention for use in conjunction with the engine ignition control system of FIG. 1.

FIG. 2 illustrates one example embodiment of an engine ignition control method 200 of the present invention for use in conjunction with engine ignition control system 10 of FIG. 1. In a first step 202, the engine ignition is turned OK For example, a driver may turn on engine ignition 16 by inserting and turning a key, or by pressing on a pushbutton.

In a next step 204, the entire engine ignition control system is turned ON. For example, each component of engine ignition control system 10 may be connected to battery power and may boot up in response to the engine ignition being turned ON. Engine ignition sensor 18 may begin monitoring engine ignition 16 and may inform controller 14 that engine ignition 16 is ON.

Next, in step 206, it is determined whether the gas cap is sealing the gas tank or not. For example, controller 14 may begin monitoring signals 22 from gas cap sensor 12 in order to ascertain whether the associated gas cap is screwed onto the gas tank and is thus "closed". If it is determined in step 206 that the gas cap is not open, but rather is closed, then operation remains in step 206 where the fuel cap is continued to be monitored. If, however, it is determined in step 206 that the gas cap is open (e.g. unscrewed from the gas tank or otherwise not fluidly sealing the gas tank, then operation proceeds to a final step 208 where the engine ignition is turned OFF. For example, controller 14 may transmit a signal 24 to engine ignition 16 wherein signal 24 results in engine ignition 16 being turned OFF. Engine ignition 16 may remain OFF until the driver has finished filling his tank, screwed the gas cap back on, and returns to the passenger compartment to manually turn engine ignition 16 back ON. When the driver manually turns engine ignition 16 back ON, operation returns to step 202 and the above-described method repeats.

Figure 3:
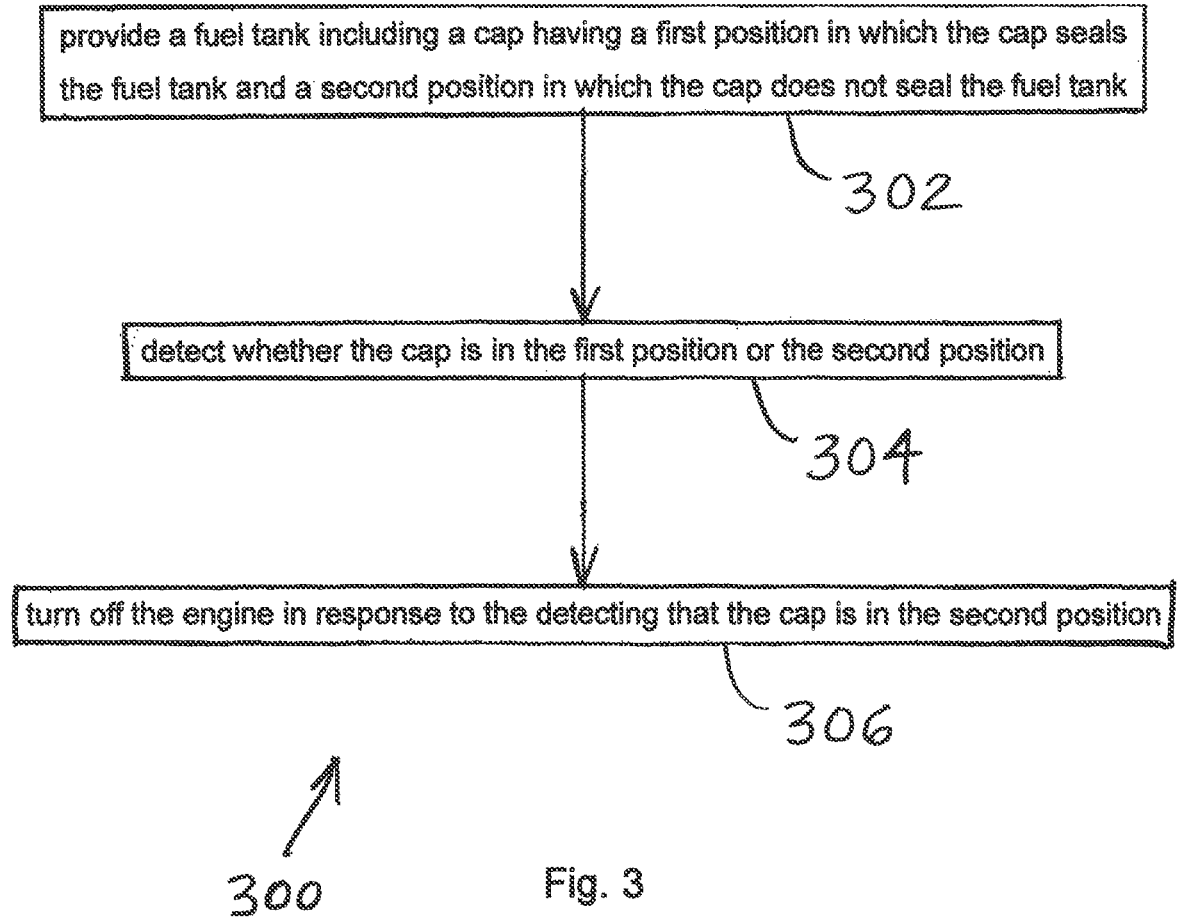
FIG. 3 is a flow chart of one example embodiment of method of the present invention for operating an engine of a motor vehicle.

FIG. 3 illustrates one example embodiment of method 300 of the present invention for operating an engine of a motor vehicle. In a first step 302, a fuel tank is provided which includes a cap having a first position in which the cap seals the fuel tank and a second position in which the cap does not seal the fuel tank. For example, fuel tank 32 may include a cap 30 having a first position 36 in which cap 30 seals the fuel tank and a second position 34 in which cap 30 does not seal fuel tank 32. Cap 30 may be screwed onto tank 32 and may be closer to tank. 32 in first position 36, and cap 30 may be unscrewed from tank 32 and may be farther from tank 32 in second position 34.

In a next step 304, it is detected whether the cap is in the first position or the second position. For example, gas cap sensor 12 may detect whether gas cap 30 on fuel tank 32 is open or closed.

In a final step 306, the engine is turned off in response to detecting that the cap is in the second position. For example, In the event that signal 22 indicates to controller 14 that the gas cap is open, then controller 14 may transmit a signal 24 to engine ignition 16 to turn OFF engine ignition 16.

The foregoing description may refer to "motor vehicle", "automobile", "automotive", or similar expressions. It is to be understood that these terms are not intended to limit the invention to any particular type of transportation vehicle, Rather; the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
an engine;
a fuel tank including a cap having a first position in which the cap seals the fuel tank and a second position in which the cap does not seal the fuel tank;
a fuel cap sensor configured to detect whether the cap is in the first position or the second position;
an ignition sensor configured to detect whether an ignition of the engine is ON or OFF; and
an electronic processor communicatively coupled to the ignition sensor and to the fuel cap sensor, the electronic processor being configured to turn off the engine when both the fuel cap sensor detects that the cap is in the second position and the ignition sensor detects that the ignition of the engine is ON.

2. The motor vehicle of claim 1 wherein the cap is screwed onto the fuel tank in the first position and is unscrewed from the fuel tank in the second position.

3. The motor vehicle of claim 1 further comprising a gear sensor configured to detect a gear that the vehicle is in, wherein the electronic processor is configured to turn off the engine when:
the fuel cap sensor detects that the cap is in the second position;
the ignition sensor detects that the ignition of the engine is ON; and
the gear sensor detects that the vehicle is in park gear.

4. The motor vehicle of claim 1 wherein the fuel tank comprises a gasoline tank.

5. The motor vehicle of claim 1 further comprising a pressure sensor configured to detect a pressure level within the fuel tank.

6. A motor vehicle, comprising:
an engine;
an ignition sensor configured to detect whether an ignition of the engine is ON or OFF;
a fuel tank including a cap having a first position in which the cap seals the fuel tank and a second position in which the cap does not seal the fuel tank;
a fuel cap sensor configured to detect whether the cap is in the first position or the second position;
a speedometer; and
an electronic processor communicatively coupled to the ignition sensor, the fuel cap sensor and the speedometer, the electronic processor being configured to turn off the engine when:
the fuel cap sensor detects that the cap is in the second position;

the ignition sensor detects that the ignition of the engine is ON; and the speedometer detects that a speed of the vehicle is substantially zero.

7. A method of operating an engine of a motor vehicle, the method comprising:

providing a fuel tank including a cap having a first position in which the cap seals the fuel tank and a second position in which the cap does not seal the fuel tank;

detecting whether the cap is in the first position or the second position;

sensing whether an ignition of the engine is ON or OFF; and turning off the engine when both the cap is in the second position and it is sensed that the ignition of the engine is ON.

8. The method of claim 7 wherein the cap is screwed onto the fuel tank in the first position and is unscrewed from the fuel tank in the second position.

9. The method of claim 7 further comprising ascertaining a gear that the vehicle is in, the engine being turned off when:

the fuel cap is in the second position;
the ignition of the engine is ON; and
the vehicle is in park gear or neutral gear.

10. The method of claim 7 wherein the fuel tank comprises a gasoline tank.

11. The method of claim 7 wherein the detecting step includes sensing a pressure level within the fuel tank.

12. A method of operating an engine of a motor vehicle, the method comprising:

providing a fuel tank including a cap having a first position in which the cap seals the fuel tank and a second position in which the cap does not seal the fuel tank;

detecting whether the cap is in the first position or the second position;

ascertaining a speed of the vehicle; and turning off the engine when:
the fuel cap is in the second position;
the ignition of the engine is ON; and
the speed of the vehicle is substantially zero.

13. An engine ignition control system for a motor vehicle, the system comprising:

an engine ignition;
an engine ignition sensor configured to detect whether the engine ignition is ON or OFF;
a gas tank cap sensor configured to detect whether a gas tank cap is open or closed;
a gear sensor configured to detect a gear that the vehicle is in; and
an electronic processor communicatively coupled to the engine ignition sensor, to the gear sensor, and to the gas tank cap sensor, the electronic processor being configured to turn off the engine when:
the gas tank cap sensor detects that the gas tank cap is open;
the engine ignition sensor detects that the ignition of the engine is ON; and
the gear sensor detects that the vehicle is in park gear.

14. The system of claim 13 wherein the cap is screwed onto a fuel tank when closed and is unscrewed from the fuel tank when open.

15. The system of claim 13 wherein the gas tank cap sensor comprises a pressure sensor configured to detect a pressure level within a fuel tank.

16. An engine ignition control system for a motor vehicle, the system comprising:

an engine ignition;
an engine ignition sensor configured to detect whether the engine ignition is ON or OFF;
a gas tank cap sensor configured to detect whether a gas tank cap is open or closed;
a speedometer; and
an electronic processor communicatively coupled to the engine ignition sensor, to the speedometer, and to the gas tank cap sensor, the electronic processor being configured to turn off the engine when:
the gas tank cap sensor detects that the cap is open;
the ignition sensor detects that the ignition of the engine is ON; and
the speedometer detects that a speed of the vehicle is substantially zero.

17. An engine ignition control system for a motor vehicle, the system comprising:

an engine ignition;
an engine ignition sensor configured to detect whether the engine ignition is ON or OFF;
a gas tank cap sensor configured to detect whether a gas tank cap is open or closed;
a speedometer; and
an electronic processor communicatively coupled to the engine ignition sensor, to the speedometer, and to the gas tank cap sensor, the electronic processor being configured to turn off the engine when:
the gas tank cap sensor detects that the cap is open;
the ignition sensor detects that the ignition of the engine is ON; and
the speedometer detects that a speed of the vehicle has been substantially zero for a time period of at least thirty seconds.

\* \* \* \* \*